Dec. 30, 1924.
C. C. FARMER
SPEED GOVERNOR DEVICE
Filed March 27, 1924
1,520,707
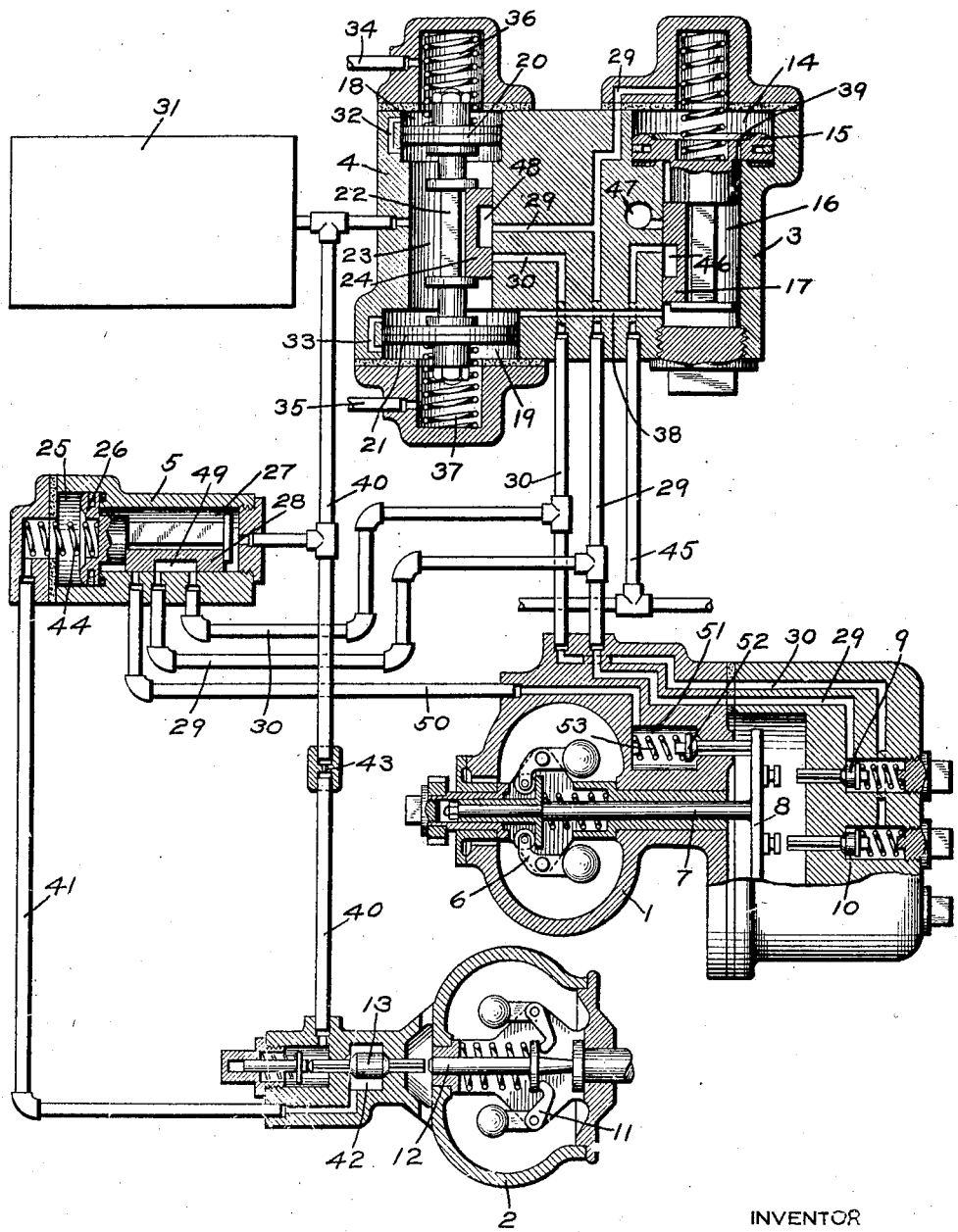
INVENTOR
CLYDE C. FARMER
BY *Wm. M. Cady*
ATTORNEY Patented Dec. 30, 1924.

1,520,707

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SPEED-GOVERNOR DEVICE.

Application filed March 27, 1924. Serial No. 702,292.

*To all whom it may concern:*

Be it known that I, CLYDE C. FARMER, a citizen of the United States, residing at Pittsburgh, in the county of Allegheny and State of Pennsylvania, have invented new and useful Improvements in Speed-Governor Devices, of which the following is a specification.

This invention relates to an automatic speed control equipment for controlling the speed of the train in accordance with the traffic conditions and the invention is in the nature of an improvement on the construction disclosed in my prior application, Serial No. 651,618, filed July 14, 1923.

In the accompanying drawing, the single figure is a diagrammatic sectional view of a train speed control apparatus embodying my invention.

In the drawing, only so much of a train speed control equipment is shown as is deemed necessary to a full understanding of the present invention, the apparatus shown including a main speed governor device 1, a safety speed governor device 2, a brake application valve device 3, a change speed valve device 4, and a transfer valve device 5.

The main speed governor device 1 may comprise a ball governor 6 of the usual construction, which is operatively connected up so as to rotate at a speed proportional to the speed of the vehicle. A spindle 7, the movement of which is controlled by the action of the ball governors 6, carries a crosshead 8, which is adapted to operate a plurality of speed controlling valves, such as a high speed valve 9 and a low speed valve 10.

The safety speed governor device 2 may comprise a casing containing a ball speed governor 11 of the usual construction, the spindle 12 of which is adapted to control the operation of a double beat valve 13, said governor being operatively connected up to rotate at a speed proportional to the speed of the vehicle.

The application valve device 3 may comprise a casing having a piston chamber 14 containing a piston 15 and a valve chamber 16 containing a slide valve 17, adapted to be operated by piston 15.

The change speed valve device 4 may comprise a casing having piston chambers 18 and 19 containing differential piston heads 20 and 21 which are connected by a stem 22 and having an intermediate valve chamber 23 containing a slide valve 24 adapted to be operated by the movements of the pistons 20 and 21.

The transfer valve device 5 may comprise a casing having a piston chamber 25 containing a piston 26 and a valve chamber 27, containing a slide valve 28 adapted to be operated by piston 26.

The high speed valve 9 controls the venting of fluid under pressure from a pipe and passage 29 which communicates directly with application piston chamber 14 and also leads to the seat of change speed slide valve 24 and the seat of transfer valve 28. The low speed valve 10 controls the venting of fluid from a pipe and passage 30, which leads to the seat of slide valve 24 and the seat of slide valve 28.

In operation, the change speed valve chamber 23 is charged with fluid under pressure from main reservoir 31 or other source of fluid pressure and with the change speed valve device in high speed position, as shown in the drawing, fluid equalizes through ports 32 and 33 around the respective pistons 20 and 21 to piston chambers 18 and 19.

The application valve chamber 16 is charged from valve chamber 23 through a passage 38 and fluid equalizes from valve chamber 16 through a restricted port 39 in piston 15 to piston chamber 14. Transfer valve chamber 27 is charged from the main reservoir 31 through pipe 40 and the pressure in piston chamber 25 is determined by the position of double beat valve 13. Said piston chamber 25 is connected by pipe 41 to valve chamber 42, containing the double beat valve 13 and when the double beat valve is in its right hand position, as shown in the drawing, fluid under pressure is supplied from pipe 40 through a restricted port 43 to pipe 41 and piston chamber 25. Fluid pressures being then equalized on opposite sides of piston 26, spring 44 will operate to shift the piston 26 to and maintain same in its right hand position, as shown in the drawing. When the double beat valve 13 is shifted to its left hand seat by operation of the safety governor 11, fluid under pressure will be vented from the piston chamber 25, so that piston 26 will be shifted to its left hand position.

Pipes 34 and 35 are connected to the respective piston chambers 18 and 19 and when certain traffic controlled apparatus (not shown) is set for permitting the train to run at the high speed limit, the pipes 34 and 35 will be closed, so that equalization of fluid pressures in piston chambers 18 and 19 is permitted. Springs 36 and 37 acting on the respective pistons 20 and 21 then operate to move the pistons to and maintain same in the high speed position, as shown in the drawing.

If the traffic controlled apparatus is set for low speed, fluid will be vented from piston chamber 19 through pipe 35, so that the pistons 20 and 21 will be shifted downwardly to the low speed position and if the traffic controlled apparatus is set for medium speed, fluid will be vented from piston chamber 18 through pipe 34, so that the differential pistons will be shifted upwardly to the medium speed position.

If the change speed valve device 4 is set for high speed, the main speed governor 6 will be effective only in case the speed of the train exceeds the high speed limit, in which case, the crosshead 8 will be moved by the action of the ball governor 6 so as to open the high speed valve 9 and thus vent fluid from the application piston chamber 14. Piston 15 is then shifted outwardly, moving slide valve 17 so as to connect the usual brake pipe 45 through cavity 46 with an exhaust port 47.

An application of the brakes is thus effected by the reduction in brake pipe pressure in the usual well known manner, thus causing a reduction in the speed of the train.

If the change speed valve device 4 is set for low speed, the slide valve 24 will be in position to connect the low speed valve 10 through pipe and passage 30 by way of cavity 48 with passage 29 leading to application piston chamber 14, so that if the low speed limit is exceeded, the low speed valve 10 will be opened and fluid vented from the application piston chamber 14, and the application valve device thereby operated to effect an application of the brakes.

When the locomotive is running at or above a predetermined low speed, such as fifteen miles per hour, the safety governor 11 is so adjusted as to shift the double beat valve to the left, so that fluid is vented from transfer piston chamber 25 to the atmosphere. Piston 26 is then shifted outwardly so as to connect pipe 29 through cavity 49 with a pipe 50. Pipe 50 leads to a valve chamber 51 containing a valve 52 and said valve is provided with a stem adapted to be engaged by the crosshead 8.

When the ball governor 6 is not rotating or the speed is quite low, the crosshead 8 will act to unseat the valve 52, but if the speed of the train is increased above seven miles per hour, for example, the crosshead 8 will be operated by the governor 6 to permit the valve 52 to be seated by the action of spring 53.

Under the above normal operating condition, the apparatus will act in the normal manner to control the speed of the train in accordance with the traffic conditions.

If the governor 6 should fail, as by the breaking of the drive shaft, or otherwise, the valve 52 will then be unseated by the crosshead 58, so that when the speed of the train reaches or exceeds fifteen miles per hour, or the setting of the safety governor 11, the transfer piston 26 will be shifted outwardly and the application piston chamber 14 will then be connected to valve chamber 51, through pipe and passage 29, cavity 49 in slide valve 28, and pipe 50. Fluid under pressure is thereupon vented from piston chamber 14, causing the application valve device 3 to move so as to effect an application of the brakes.

If the train is running at a speed exceeding fifteen miles per hour and the governor 6 should become defective, so that the governor balls cease to rotate, the crosshead 8 will be returned to normal position, so as to unseat the valve 52 and thus cause the brakes to be applied.

If the safety governor 2 should fail, the governor 11 will permit the double beat valve 13 to move to the right hand position, as shown in the drawing, in which fluid under pressure is supplied from pipe 40 to pipe 41 and thence to piston chamber 25. Piston 26 then shifts the slide valve 28 to the right, as shown in the drawing, and in this position, pipe 30 is connected, through cavity 49 with pipe 29. The low speed valve 10 is thus connected to application piston chamber 14, regardless of the position of the change speed valve device 4, so that if the speed of the train should exceed the low speed limit at which the governor valve 10 is adapted to be opened by the operation of the governor 6, fluid under pressure will be vented from the application piston chamber 14 so as to cause the operation of the application valve device and a consequent application of the brakes.

In the above described construction, the valve 52 is not connected to the application piston chamber 14, except when the transfer valve device 5 is moved to its outer position and consequently there is no possibility of leakage from the application chamber when the train is running at a low speed and the valve 52 is unseated.

Having now described my invention, what I claim as new and desire to secure by Letters Patent, is:—

1. In a train speed control apparatus, the combination with a fluid pressure controlled valve device operative to reduce the speed of the train, of a main speed governor, a valve operable by said governor, a safety speed governor, and a valve device controlled by said safety governor for controlling communication from said fluid pressure controlled valve device to said valve.

2. In a train speed control apparatus, the combination with a fluid pressure controlled valve device operative to reduce the speed of the train, of a main speed governor, a valve operated under failure of said governor for varying the pressure on said valve device, a safety speed governor, and a valve device operated by said safety speed governor when the speed of the train exceeds a predetermined speed limit for establishing communication from said fluid pressure controlled valve device to said valve.

3. In a train speed control apparatus, the combination with an application valve device operated upon a reduction in fluid pressure for effecting an application of the brakes, of a main speed governor, a valve operated upon failure of said governor for venting fluid from said valve device, a safety speed governor, and a valve device operated by said safety governor when the speed of the train exceeds a predetermined speed limit for establishing communication from said application valve device to said valve.

4. In a train speed control apparatus, the combination with an application valve device operated upon a reduction in fluid pressure for effecting an application of the brakes, of a main speed governor, a vent valve adapted to be opened by said governor when the speed of the governor is less than a predetermined speed, a safety speed governor, and a valve device operated by said safety governor when the speed of the train exceeds a predetermined speed limit, for establishing communication from said application valve device to said vent valve.

In testimony whereof I have hereunto set my hand.

CLYDE C. FARMER.